United States Patent
Lehmann

(10) Patent No.: US 7,837,266 B2
(45) Date of Patent: Nov. 23, 2010

(54) TRANSMISSION DEVICE FOR A VEHICLE SEAT

(75) Inventor: Ulrich Lehmann, Alfter (DE)

(73) Assignee: KEIPER GmbH & Co. KG, Kaiserslautern (DE)

( * ) Notice: Subject to any disclaimer, the term of this patent is extended or adjusted under 35 U.S.C. 154(b) by 338 days.

(21) Appl. No.: 12/278,635

(22) PCT Filed: Aug. 7, 2007

(86) PCT No.: PCT/EP2007/006954

§ 371 (c)(1),
(2), (4) Date: Aug. 7, 2008

(87) PCT Pub. No.: WO2008/028549

PCT Pub. Date: Mar. 13, 2008

(65) Prior Publication Data

US 2009/0021062 A1 Jan. 22, 2009

(30) Foreign Application Priority Data

Sep. 7, 2006 (DE) .................... 10 2006 041 917

(51) Int. Cl.
*B60N 2/02* (2006.01)
(52) U.S. Cl. .................. 297/362.12; 297/361.1; 297/362; 297/463.1; 297/354.1; 475/162

(58) Field of Classification Search ............. 297/361.1, 297/362, 362.12, 463.1, 354.1; 475/162
See application file for complete search history.

(56) References Cited

U.S. PATENT DOCUMENTS

| 5,398,904 | A | | 3/1995 | Rees | |
|---|---|---|---|---|---|
| 5,634,689 | A | * | 6/1997 | Putsch et al. | 297/362 |
| 5,749,624 | A | * | 5/1998 | Yoshida | 297/367 R |
| 7,264,566 | B2 | * | 9/2007 | Dill et al. | 475/164 |
| 7,461,900 | B2 | * | 12/2008 | Lange | 297/367 R |
| 7,497,520 | B2 | * | 3/2009 | Assmann | 297/367 R |

FOREIGN PATENT DOCUMENTS

DE  43 40 696 C1  6/1995

* cited by examiner

*Primary Examiner*—Laurie K Cranmer
(74) *Attorney, Agent, or Firm*—McGlew and Tuttle, P.C.

(57) ABSTRACT

In the case of a transmission device (5) for a vehicle seat (1), in particular a motor vehicle seat, with at least one hub (7, 27, 27', 27") and a shaft (10) which interact in a form-fitting manner in order to transmit a torque, wherein the shaft (10) has a profile with m teeth (12) and the hub (7, 27, 27', 27") has a profile with a central opening with n receptacles (15, 15'), and wherein each receptacle (15, 15') is designed for interaction with a tooth (12), the hub (7, 27, 27', 27") has n=2m receptacles (15, 15') or n=2m−1 receptacles (15, 15').

20 Claims, 2 Drawing Sheets

TRANSMISSION DEVICE FOR A VEHICLE SEAT

CROSS REFERENCE TO RELATED APPLICATIONS

This application is a United States National Phase application of International Application PCT/EP2007/006954 and claims the benefit of priority under 35 U.S.C. §119 of German Patent Application DE 10 2006 041 917.0 filed Sep. 7, 2006, the entire contents of which are incorporated herein by reference.

FIELD OF THE INVENTION

The invention relates to a transmission device for a vehicle seat, in particular a motor vehicle seat, with at least one hub and a shaft which interact in a form-fitting manner in order to transmit a torque.

BACKGROUND OF THE INVENTION

DE 43 40 696 C1 discloses a transmission device of this type, which is explained in more detail with reference to FIGS. 5 and 6 below, for a vehicle seat. The shaft W of the known transmission device lacks a tooth at one point in relation to a hexagonal symmetry, and therefore there is a total of m=5 teeth. A hub $27p'$ provided on a driver of a geared fitting has the corresponding mating profile, i.e. n=5 receptacles. This provides security against twisting, according to which the known shaft W can be inserted into the hub $27p'$ only in one orientation modulo 360°, i.e. the security against twisting amounts to 360°. After a full revolution of the driver, i.e. of the shaft W, brings about a rotation of the two fitting parts of the geared fitting by one tooth, i.e. by just a few angular degrees, which can be recognized by even the naked eye, this security against twisting of 360° is sufficient for this application. A hub $27p$ which is provided on a hand wheel has the unchanged hexagonal symmetry, i.e. n=6 receptacles, since the precise orientation between the known shaft W and hand wheel is not of significance. The hand wheel can thus be placed onto the known shaft W in six different orientations, i.e. the security against twisting amounts to 360°/n=60° for this application, but could be even less.

SUMMARY OF THE INVENTION

The invention is based on the object of improving a transmission device of the type mentioned at the beginning, in particular in respect of costs. This object is achieved according to the invention by a transmission device for a vehicle seat comprising a hub and a shaft. The shaft engages the hub in a form-fitting manner such that the shaft transmits a torque to the hub. The shaft may have a profile with m number of teeth. The hub may have a profile with a central opening with n number of receptacles. At least one of the receptacles receives one of the teeth of the shaft. The hub may have n=2m receptacles or n=2m−1 receptacles.

The transmission device may comprise a second hub having n number of second receptacles. The n number of second receptacles of the second hub may not be equal to the n number of receptacles of the hub. Each second receptacle may have a second receptacle width. Each receptacle of the hub may have a first receptacle width. The first receptacle width may not be equal to the second receptacle width.

At least one of the hub and the second hub may have n=m receptacles.

The hub may be part of a hand wheel or part of a driver for driving or unlocking a fitting.

The fitting may move seat components of the vehicle seat relative to one another such that the fitting adjusts the inclination of a backrest of the vehicle seat.

The fitting may be located on one side of the vehicle seat and a second fitting may be located on another side of the vehicle seat. The fitting and the second fitting may be connected via the shaft.

The profile of the shaft may extend over a length thereof.

The shaft may have a splined shaft profile with splines. The splines may form the teeth of the shaft.

The shaft may have three teeth.

In addition to the two applications which are mentioned at the beginning and have very different requirements with regard to the security against twisting, i.e. to the relative orientation of shaft and hub, a further application is conceivable for a latching fitting, in which a security against twisting of 360°/n=120° would suffice, this being achieved by a symmetrical arrangement of m=3 teeth of the shaft and n=3 receptacles of the hub. Since the torque applied to the driver of a matching fitting serves only for unlocking purposes, three teeth also suffice from this aspect.

As a result of the fact that the hub has n=2m receptacles or n=2m−1 receptacles, a system of compatible shafts and hubs, with which shafts and hubs can be combined in accordance with the application, is available in the manner of a construction kit. The hub can thus be part of a hand wheel or lever or a driver for driving or unlocking a fitting which is used to move seat components of the vehicle seat relative to one another, in particular to adjust the inclination of a backrest. A respective fitting is preferably provided in this case on both sides of the vehicle seat, with the two fittings being connected to each other by the shaft, i.e. ultimately three shafts can be used in the transmission device according to the invention.

The shaft can be manufactured with a smaller number of teeth (m<n) while at the same time existing tools continue to be used for the hub. Both aspects reduce the production costs. Hubs with n=m receptacles can be incorporated into the system, even those with wider receptacles for compensating for tolerances.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
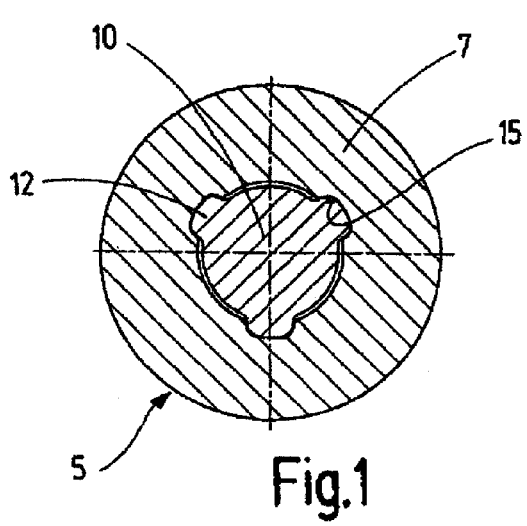
FIG. 1 is a cross sectional view of the exemplary embodiment in the region of the first hub.
Figure 2:
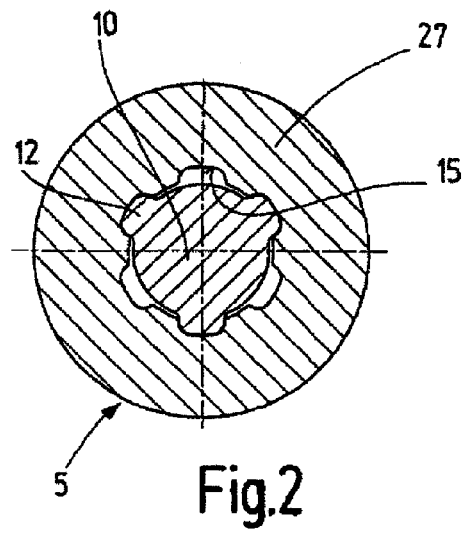
FIG. 2 is a cross sectional view of the exemplary embodiment in the region of a second hub.
Figure 3:
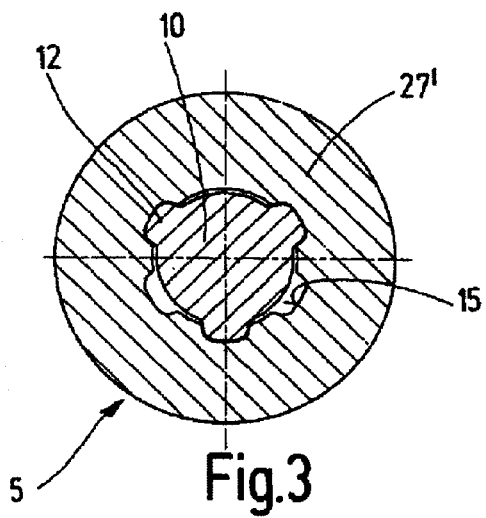
FIG. 3 is a cross sectional view of the exemplary embodiment in the region of a modified second hub.
Figure 4:
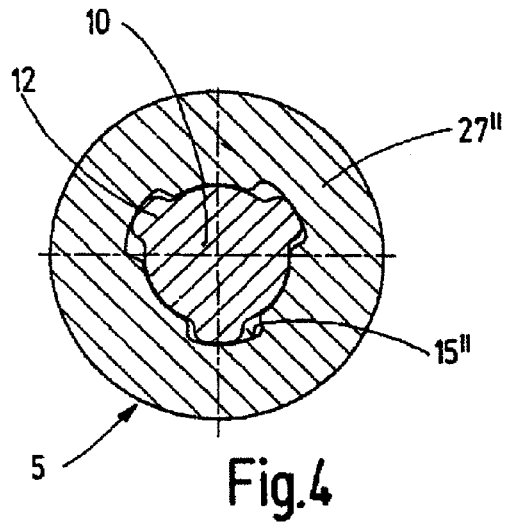
FIG. 4 is a cross sectional view of the exemplary embodiment in the region of a further modified hub.
Figure 5:
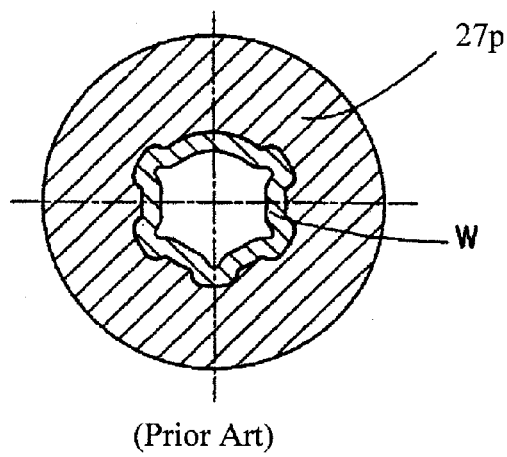
FIG. 5 is a cross sectional view of a known transmission device.
Figure 6:
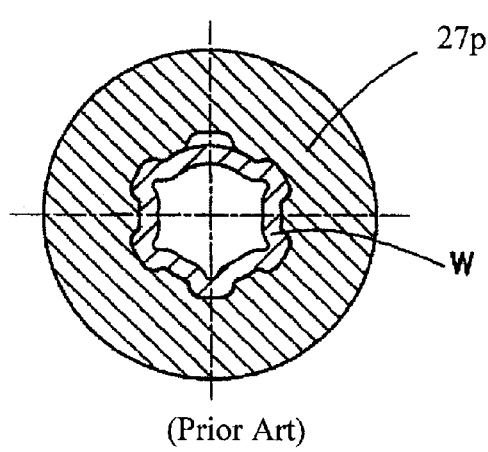
FIG. 6 is a cross sectional view of another known transmission device.
Figure 7:
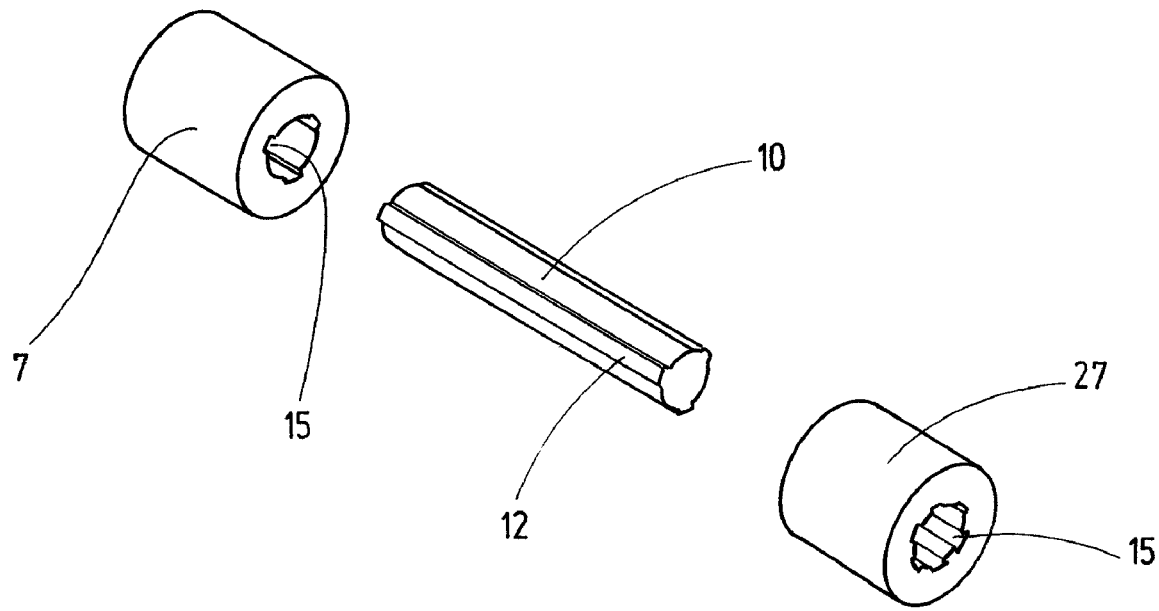
FIG. 7 is a perspective view of the exemplary embodiment.
Figure 8:
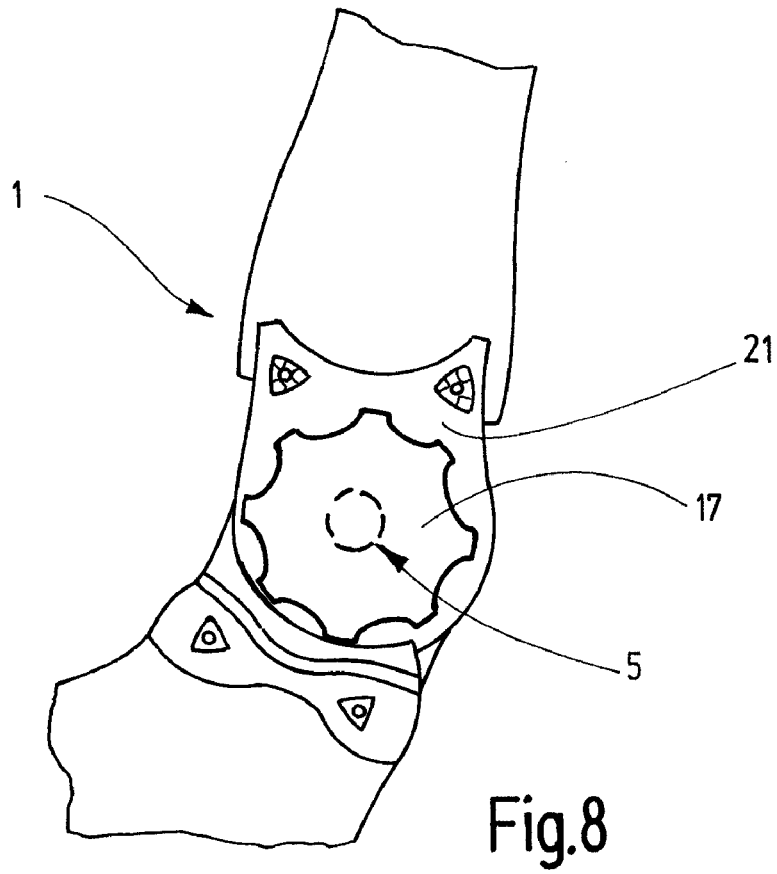
FIG. 8 is a partial side view of a vehicle seat.

Referring to FIGS. 1-4, 7 and 8 in particular, FIG. 8 shows a vehicle seat 1 of a motor vehicle having at least one transmission device 5 which comprises at least one first hub 7 and a shaft 10 which are both mounted rotatably. The transmission device 5 serves to transmit a torque from the first hub 7 to the shaft 10 or from the shaft 10 to the first hub 7. For this purpose, the central opening of the first hub 7 and the shaft 10 are profiled in a matching manner.

The profile of the shaft 10 has m teeth 12, which are also to be understood as including other radially outwardly protruding portions of material, for example, splines, corners or other convex shapes. The number m of teeth 12 is preferably three, but may also be four or five, if appropriate also two or one. The m teeth 12 are of identical design to one another and are distributed uniformly over the periphery of the shaft 10. The profile of the central opening of the first hub 7 has n receptacles 15, which are also to be understood as including other radial cutouts in the material of the first hub 7, for example, grooves or other concave shapes. The number n of receptacles 15 is at least as large as the number m of teeth 12, in the simplest case is equal. If the shaft 10 is inserted into the first hub 7, they interact in a form-fitting manner and can transmit the torque.

In the present case, the profile of the shaft 10 is a splined shaft profile with trigonal symmetry, i.e. three integrally formed splines which are offset from one another by 120° in each case protrude radially out from a circular core cross section of the shaft 10 as the teeth 12. The profile of the central opening of the first hub 7 has correspondingly three grooves which are offset with respect to one another by 120° in each case as the receptacle 15.

The transmission device 5 can be inserted in the vehicle seat 1 in such a manner that, for example, the shaft 10 serves as a transmission rod and the first hub 7 forms part of a hand wheel 17 or of a lever or a driver of a fitting 21, by means of which the fitting 21—in the case of a geared fitting—is driven or—in the case of a latching fitting—is unlocked. Fittings 21 with which seat components of the vehicle seat 1 are moved relative to one another, for example the inclination of a backrest is adjusted, are generally provided on each of the two sides of the vehicle seat. The transmission device 5 therefore has at least one second hub 27, if appropriate even more second hubs 27, with the result that overall a plurality of hubs are connected by the shaft 10 and interact therewith. The shaft 10 has its profile preferably over its entire length or virtually over the entire length, for example in the case of reworked end sections. In the simplest case, the second hub 27 is designed in the same manner as the first hub 7.

However, it is also possible, depending on the application for the second hub 27 to have a different profile with a greater number n of receptacles 15 in order to be compatible with shafts having a higher number m of teeth for transmitting larger torques or with the continued use of old tools. For example, it is possible for double the number of receptacles to be provided, i.e. n=2m receptacles 15, which are then again distributed uniformly over the periphery. A tooth 12 therefore comes to lie in every second receptacle 15. In the case of three teeth 12, there are six receptacles 15. In the case of second hubs 27' with protection against twisting, the symmetry is broken, and a receptacle 15 is missing at one point with the result that there are overall n=2m−1 receptacles 15. In the case of three teeth 12, there are five receptacles 15, with reduced protection against twisting being maintained in this arrangement, i.e. the shaft 10 can be inserted into the second hub 27' only in three orientations. However, for the purpose of compensating for tolerances between the two sides of the vehicle seat, it may also be necessary for there to be play in the second hub 27", preferably in the form of idle travel which is passed through prior to the form-fitting interaction. For this purpose, the second hub 27" has n=m receptacles 15" with a greater width, i.e. dimensioning in the peripheral direction.

Overall, a system is therefore provided, in which shafts 10 and hubs 7, 27, 27' and 27" with different number m of teeth 12 and n of receptacles 15 and 15" are compatible with one another and can be combined depending on the application or existing tools. In a transmission device 5, the same shaft 10 can interact with at least two hubs 7, 27, 27' and 27" which have between each other at least two different numbers of receptacles 15 and/or two different widths of receptacles 15, 15'.

While specific embodiments of the invention have been shown and described in detail to illustrate the application of the principles of the invention, it will be understood that the invention may be embodied otherwise without departing from such principles.

The invention claimed is:

1. A transmission device for a vehicle seat, the device comprising:
    a hub;
    a shaft engaging said hub in a form-fitting manner such that said shaft transmits a torque to said hub, said shaft having a profile with m number of teeth, said hub having a profile with a central opening with n number of receptacles, at least one of said receptacles receiving one of said teeth of said shaft, said hub having n=2m receptacles or n=2m−1 receptacles.

2. A transmission device as claimed in claim 1, further comprising:
    a second hub having n number of second receptacles, said n number of second receptacles of said second hub not being equal to said n number of receptacles of said hub, each second receptacle having a second receptacle width, each receptacle of said hub having a first receptacle width, said first receptacle width not being equal to said second receptacle width.

3. A transmission device as claimed in claim 2, wherein at least one of said hub and said second hub has n=m receptacles.

4. A transmission device as claimed in claim 1, wherein said hub is part of a hand wheel or part of a driver for driving or unlocking a fitting.

5. A transmission device as claimed in claim 4, wherein said fitting moves seat components of the vehicle seat relative to one another such that said fitting adjusts the inclination of a backrest of the vehicle seat.

6. A transmission device as claimed in claim 4, wherein said fitting is located on one side of the vehicle seat and a second fitting is located on another side of the vehicle seat, said fitting and said second fitting being connected via said shaft.

7. A transmission device as claimed in claim 1, wherein said profile of said shaft extends over a length thereof.

8. A transmission device as claimed in claim 1, wherein said shaft has a splined shaft profile with splines, said splines forming said teeth of said shaft.

9. A transmission device as claimed in claim 1, wherein said shaft has three said teeth.

10. A vehicle seat, comprising:

a transmission device comprising a hub and a shaft engaging said hub such that said shaft transmits a torque to said hub, said shaft having an outer shaft surface defining m number of teeth, said hub having an inner hub surface defining a central opening and n number of receptacles, at least one of said receptacles of said hub receiving one of said teeth of said shaft, said hub having one of n=2m receptacles and n=2m−1 receptacles.

11. A vehicle seat as claimed in claim 10, wherein said hub is connected to a handwheel for moving a fitting.

12. A vehicle seat as claimed in claim 11, further comprising:

a backrest portion; and a leg engaging portion.

13. A vehicle seat as claimed in claim 12, wherein said handwheel is actuated such that said fitting moves said backrest portion relative to said leg engaging portion, whereby said handwheel adjusts an inclination position of said backrest portion.

14. A vehicle seat as claimed in claim 12, wherein said fitting is connected to said backrest portion on one side of the vehicle seat and a second fitting is connected to said backrest portion on another side of the vehicle seat, said fitting being connected to said second fitting via said shaft.

15. A vehicle seat as claimed in claim 10, wherein said transmission device comprises a second hub having n number of second receptacles, said n number of second receptacles of said second hub not being equal to said n number of receptacles of said hub, each second receptacle having a second receptacle width, each receptacle of said hub having a first receptacle width, said first receptacle width not being equal to said second receptacle width.

16. A vehicle seat as claimed in claim 15, wherein at least one of said hub and said second hub has n number of receptacles equal to m number of teeth of said shaft.

17. A transmission device for a vehicle seat, the device comprising:

a shaft receiving element having an inner surface defining a central opening and a number of shaft teeth receiving recesses;

a shaft having an outer surface defining a number of shaft teeth, said shaft receiving element receiving said shaft via said central opening such that one of said shaft teeth engages one of said shaft teeth receiving recesses, said shaft transmitting a torque to said shaft receiving element via engagement of said one of said shaft teeth with said one of said shaft teeth receiving recesses, wherein said number of shaft teeth receiving recesses of said shaft receiving element is equal to one of two times said number of shaft teeth and one less two times said number of shaft teeth.

18. A transmission device as claimed in claim 17, wherein said shaft receiving element forms a portion of a hand wheel or a portion of a driver for driving or unlocking a fitting.

19. A transmission device as claimed in claim 17, further comprising:

a second shaft receiving element having a second inner surface defining a number of second shaft teeth receiving recesses and a second central opening, said shaft extending through said second central opening of said second shaft, said number of second shaft teeth receiving recesses of said second shaft receiving element being different than said number of shaft teeth receiving recesses of said shaft receiving element, one of said second shaft teeth receiving recesses having a second shaft tooth receiving recess width, one of said shaft teeth receiving recesses having a first shaft tooth receiving recess width, said first shaft tooth receiving recess width being different than said second shaft tooth receiving recess width.

20. A transmission device as claimed in claim 19, wherein said number of second shaft teeth receiving recesses of said second shaft receiving element is equal to said number of shaft teeth.

* * * * *